United States Patent
Gupta et al.

(10) Patent No.: US 10,901,904 B2
(45) Date of Patent: Jan. 26, 2021

(54) USING A MACHINE LEARNING MODULE TO PERFORM DESTAGES OF TRACKS WITH HOLES IN A STORAGE SYSTEM

(71) Applicant: International Business Machines Corporation, Armonk, NY (US)

(72) Inventors: Lokesh M. Gupta, Tucson, AZ (US); Kyler A. Anderson, Sahuarita, AZ (US); Kevin J. Ash, Tucson, AZ (US); Matthew G. Borlick, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 16/170,968

(22) Filed: Oct. 25, 2018

(65) Prior Publication Data

US 2020/0133856 A1 Apr. 30, 2020

(51) Int. Cl.
*G06F 12/0868* (2016.01)
*G06F 12/0871* (2016.01)
*G06N 20/00* (2019.01)

(52) U.S. Cl.
CPC ...... *G06F 12/0868* (2013.01); *G06F 12/0871* (2013.01); *G06N 20/00* (2019.01); *G06F 2212/1016* (2013.01); *G06F 2212/262* (2013.01); *G06F 2212/312* (2013.01); *G06F 2212/462* (2013.01); *G06F 2212/502* (2013.01)

(58) Field of Classification Search
CPC ..... G06F 3/06–0689; G06F 12/08–128; G06F 2212/462; G06F 12/0868; G06F 12/0871
See application file for complete search history.

(56) References Cited

U.S. PATENT DOCUMENTS

| 8,675,868 B1 | 3/2014 | Yearsley et al. |
| 2003/0005418 A1 | 1/2003 | Sridhar et al. |
| 2004/0255026 A1* | 12/2004 | Blount ............... G06F 3/0613 |
| | | 709/226 |

(Continued)

FOREIGN PATENT DOCUMENTS

| CN | 103946790 | 7/2014 |
| WO | WO2071230 A1 | 9/2002 |

OTHER PUBLICATIONS

U.S. Appl. No. 16/170,979, filed Oct. 25, 2018.

(Continued)

*Primary Examiner* — Reginald G Bragdon
*Assistant Examiner* — Curtis James Kortman
(74) *Attorney, Agent, or Firm* — Konrad Raynes Davda & Victor LLP; Rabindranath Dutta

(57) ABSTRACT

In response to an end of track access for a track in a cache, a determination is made as to whether the track has modified data and whether the track has one or more holes. In response to determining that the track has modified data and the track has one or more holes, an input on a plurality of attributes of a computing environment in which the track is processed is provided to a machine learning module to produce an output value. A determination is made as to whether the output value indicates whether one or more holes are to be filled in the track. In response to determining that the output value indicates that one or more holes are to be filled in the track, the track is staged to the cache from a storage drive.

25 Claims, 14 Drawing Sheets

(56) References Cited

U.S. PATENT DOCUMENTS

| | | | |
|---|---|---|---|
| 2008/0091875 A1* | 4/2008 | Mannenbach | G06F 12/12 |
| | | | 711/113 |
| 2013/0117286 A1* | 5/2013 | Gallant | G06F 3/0614 |
| | | | 707/752 |
| 2013/0132664 A1 | 5/2013 | Benhase et al. | |
| 2014/0089265 A1 | 3/2014 | Talagala et al. | |
| 2016/0011801 A1 | 1/2016 | Goldberg et al. | |
| 2016/0179372 A1 | 6/2016 | Sinclair | |
| 2018/0004690 A1 | 1/2018 | Kaminski et al. | |
| 2018/0024919 A1 | 1/2018 | Geml et al. | |

OTHER PUBLICATIONS

Dufrasne, B. et al., "IBM DS8880 Architecture and Implementation (Release 83)", Fourth Edition (Nov. 2017), © Copyright International Business Machines Corporation 2016, 2017. Total 510 pp.
Wilkes, J. et al., "The HP AutoRAID Hierarchical Storage System", © 1996 ACM, Total 29 pp.
List of IBM Patents or Patent Applications Treated As Related, Oct. 26, 2018, Total 2 pp.
International Search Report and Written Opinion for International Application No. PCT/IB2019/058286, dated Jan. 3, 2020, 9 pp.
English Language Translation of Cn Publication No. 103946790, dated Jul. 23, 2014, 17 pp.

* cited by examiner

USING A MACHINE LEARNING MODULE TO PERFORM DESTAGES OF TRACKS WITH HOLES IN A STORAGE SYSTEM

BACKGROUND

1. Field

Embodiments relate to using a machine learning module to perform destages of tracks with holes in a storage system.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts. A plurality of such storage controllers, hosts, and other computational devices may be deployed at one or more sites to provide an environment for storage and management of data and also to provide an environment for data processing.

The storage controller may include two or more servers, where each server may be referred to as a node, a storage server, a processor complex, a Central Processor Complex (CPC), or a Central Electronics Complex (CEC). Each server may have a plurality of processor cores and the servers may share the workload of the storage controller. In a two server configuration of the storage controller that is also referred to as a dual server based storage controller, in the event of a failure of one of the two servers, the other server that has not failed may take over the operations performed by the failed server.

Data written from a host may be stored in the cache of the storage controller, and at an opportune time the data stored in the cache may be destaged (i.e., moved or copied) to a storage device. Data may also be staged (i.e., moved or copied) from a storage device to the cache of the storage controller. The storage controller may respond to a read I/O request from the host from the cache, if the data for the read I/O request is available in the cache, otherwise the data may be staged from a storage device to the cache for responding to the read I/O request. A write I/O request from the host causes the data corresponding to the write to be written to the cache, and then at an opportune time the written data may be destaged from the cache to a storage device. Since the storage capacity of the cache is relatively small in comparison to the storage capacity of the storage devices, data may be periodically destaged from the cache to create empty storage space in the cache. Data may be written and read from the cache much faster in comparison to reading and writing data from a storage device. In computing, cache replacement policies are used to determine which items to discard (i.e., demote) from the cache to make room for new items in the cache. Further details of a storage controller and its various components may be found in the publication "IBM DS8880 Architecture and Implementation (Release 8.3)," published November 2017, by International Business Machines Corporation.

Artificial neural networks (also referred to as neural networks) are computing systems that may have been inspired by the biological neural networks that constitute animal brains. Neural networks may be configured to use a feedback mechanism to learn to perform certain computational tasks. Neural networks are a type of machine learning mechanism.

SUMMARY OF THE PREFERRED EMBODIMENTS

Provided are a method, system, and computer program product in which in response to an end of track access for a track in a cache, a determination is made as to whether the track has modified data and whether the track has one or more holes. In response to determining that the track has modified data and the track has one or more holes, an input on a plurality of attributes of a computing environment in which the track is processed is provided to a machine learning module to produce an output value. A determination is made as to whether the output value indicates whether one or more holes are to be filled in the track. In response to determining that the output value indicates that one or more holes are to be filled in the track, the track is staged to the cache from a storage drive. As a result, a machine learning module is used for management of holes in a track during destages.

In additional embodiments, in response to completion of staging of the track to the cache from the storage drive, the track is destaged from the cache. As a result, in certain embodiments tracks are destaged after filling existing holes in the track.

In further embodiments, the computing environment comprises a storage controller having the cache, wherein the storage controller is coupled to one or more storage drives in a RAID configuration that stores parity information, wherein the storage controller manages the one or more storage drives to allow input/output (I/O) access to one or more host computing systems. As a result, a machine learning module is used within a storage controller.

In certain embodiments, the plurality of attributes further includes: a measure of a current bandwidth of an adapter for the storage drive; and a measure of an optimum adapter bandwidth of the adapter for the storage drive, wherein the adapter starts thrashing if the optimum adapter bandwidth is exceeded. As a result, at least adapter bandwidths are a factor in the management of holes in a track during destages.

In further embodiments, the plurality of attributes further include: a measure of a speed for a storage rank in which the storage drive is included; a measure of a response time of the storage rank for staging; and a measure of a response time of the storage rank for destaging. As a result, at least response times of storage ranks are a factor in the management of holes in a track during destages.

In yet further embodiments, the plurality of attributes include: a measure of how many task control blocks are allocated for staging; a measure of how many task control blocks are allocated for destaging; a measure of how many holes are present in the track; and a measure of how many requests are queued for staging. As result, number of task control blocks and number of holes are a factor in the management of holes in a track during destages.

In certain embodiments, the plurality of attributes further include: a measure of an overall non-volatile storage usage; a measure of a non-volatile storage usage for a rank that includes the storage drive; and a measure of a maximum non-volatile storage allowed for the rank. As result, the usage of non-volatile storage is a factor in the management of holes in a track during destages.

BRIEF DESCRIPTION OF THE DRAWINGS

Referring now to the drawings in which like reference numbers represent corresponding parts throughout.

DETAILED DESCRIPTION

Figure 1:
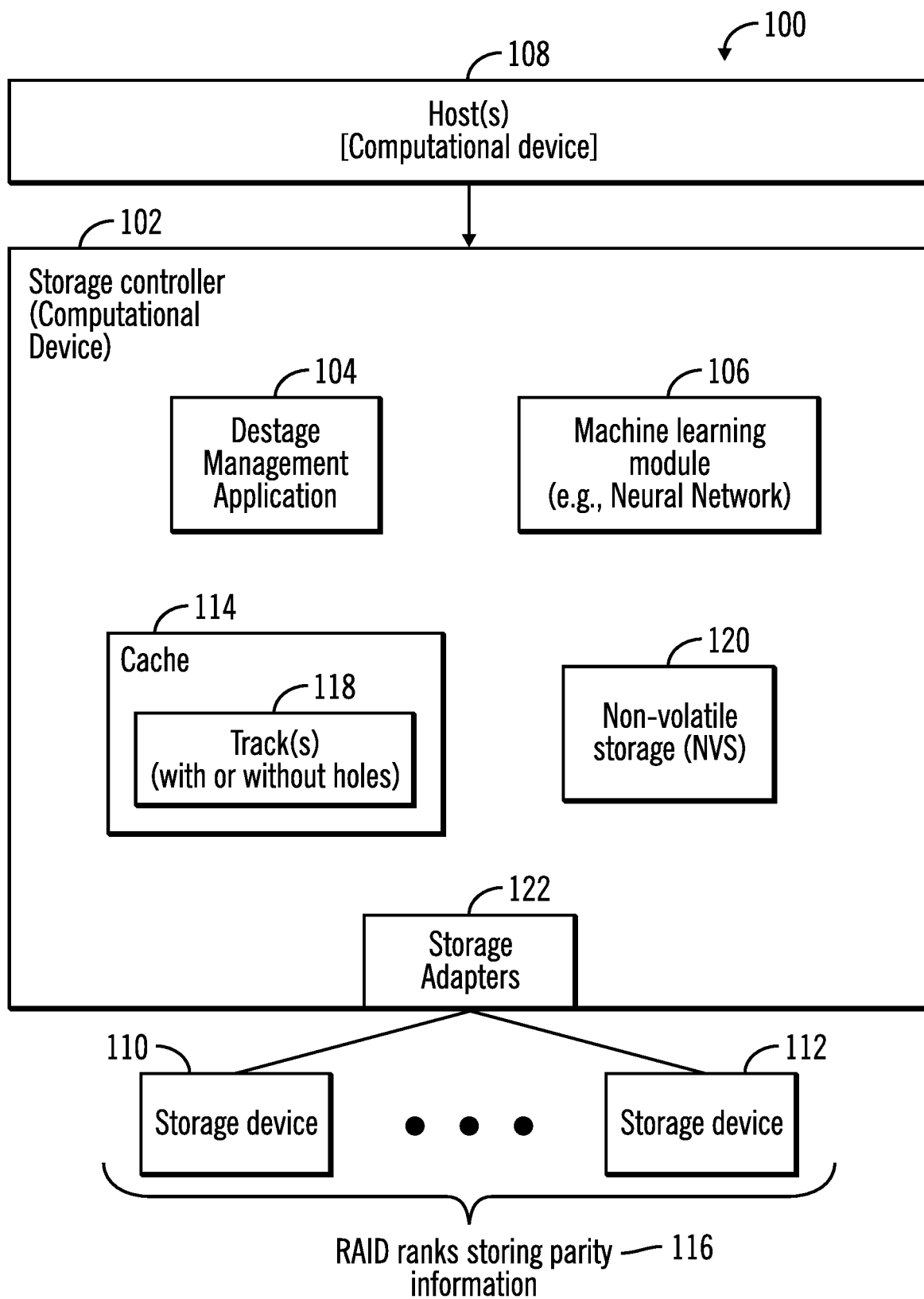
FIG. 1 illustrates a block diagram of a computing environment comprising a computational device in which a destage management application and a machine learning module are implemented, in accordance with certain embodiments.

In the following description, reference is made to the accompanying drawings which form a part hereof and which illustrate several embodiments. It is understood that other embodiments may be utilized and structural and operational changes may be made.

A track in a cache may include a plurality of sectors. In certain situations, data may be modified in only some sectors of plurality of sectors of the track, where the data is modified because of writes. The sectors that do not have modified data may be interspersed among sectors that have modified data. Therefore, a track may have one or more holes, where a hole is one or more contiguous sectors of the track that do not have modified data.

When a track has a lot of holes (e.g. four or more) and the track is modified then a destage of the track has to be performed via a plurality of destages, as each contiguous sector having modified data that is interspersed among the holes is destaged separately. This may increase the number of I/O operations in certain situations and cause an increased response time in certain disk configurations, such as in certain Redundant Array of Independent Disk (RAID) configurations (e.g., RAID 5 and RAID 6) that store parity information. In such situations, each destage may need to stage the parity, compute new parity and then destage the new data and new parity and such increased number of I/O operations may cause an increase in the response time for the RAID ranks.

In order to prevent the increase in the number of I/O operations, the cache may attempt to perform a pre-stage for tracks with a large number of holes. At the end of track access, if the track is modified then the cache checks for the number of holes in the track. If the number of holes is greater than a predetermined number (e.g., 4) then the cache starts a full track pre-stage to fill all the holes. However, if there are too many holes in the track, then the cache may have to perform too many stages. If the adapter bandwidth is high then the stages may saturate the adapter and this may impact the performance of the storage system.

In certain embodiments, a machine learning module is used to determine whether or not to perform a pre-stage to fill the holes in a track, prior to a destage of the track, or whether to perform a plurality of destages from the track. The machine learning module receives a plurality of inputs relating to the number of stage and destage task control blocks (TCB), the number of holes, RAID rank response times, adapter bandwidths, etc. and generates an output that indicates whether or not to perform a pre-stage to fill the holes in the track. The machine learning module is trained over time to improve the predictive accuracy of determining whether or not to perform a pre-stage to fill the holes in the track by computing a margin of error for performing back propagation in the machine learning module, based on a difference of the desirable adapter bandwidths and rank response times to the actual adapter bandwidths and rank response times. As a result, improvements are made to the operations of a storage controller.

Exemplary Embodiments

FIG. 1 illustrates a block diagram of a computing environment 100 comprising a storage controller in which a destage management application 104 and a machine learning module 106 are implemented, in accordance with certain embodiments.

The storage controller 102 is configured to receive input/output (I/O) requests from the host computational devices 108 and provide access to a plurality of storage devices 110, 112 that are present in the computing environment 100. The storage controller 102 allows the one or more hosts computing devices 108 to perform input/output (I/O) operations with logical storage maintained by the storage controller 102. The physical storage corresponding to the logical storage may be found in one or more of the storage devices 110, 112 and/or a cache 114 of the storage controllers 102.

The storage controller 102 and the host computational devices 108 may comprise any suitable computational device including those presently known in the art, such as, a personal computer, a workstation, a server, a mainframe, a hand held computer, a palm top computer, a telephony device, a network appliance, a blade computer, a processing device, a controller, etc.

The storage controller 102, the host computational devices 108, and the storage devices 110, 112 may be elements in any suitable network, such as, a storage area network, a wide area network, the Internet, an intranet. In certain embodiments, the storage controller 102, the host computational devices 108, and the storage devices 110, 112 may be elements in a cloud computing environment.

The plurality of storage devices 110, 112 may be comprised of any storage devices known in the art, such as solid state drives (SSD), hard disk drives (HDD), etc. In certain embodiments, the plurality of storage devices 110, 112 may comprise RAID ranks that store parity information (as shown via reference numeral 116).

In certain embodiments, the destage management application 104 and the machine learning module 106 may be implemented in software, hardware, firmware or any combination thereof. The destage management application 104 uses the machine learning module 106 to determine whether or not to perform a pre-stage to fill the holes in a track 118, prior to a destage of the track 118, or whether to perform a plurality of destages from the track 118 to destage the track.

In addition to the cache 114 which is a volatile memory that is used as a read and write cache, the storage controller 102 may include a non-volatile storage (NVS) 120 that is used to maintain and back up a second copy of the cache 114. If power is lost, batteries keep the storage controller 102 running until all data in NVS 120 is written to internal disks of the storage controller 102. The NVS 120 scales to the processor memory that is installed in the storage controller 102.

In certain embodiments, a plurality of storage adapters 122 may provide an interface between the storage controller 102 and the plurality of storage devices 110, 112.

In certain embodiments, the machine learning module 106 may implement a machine learning technique such as decision tree learning, association rule learning, neural network, inductive programming logic, support vector machines, Bayesian models, etc. In certain embodiments, the machine learning module 106 is a neural network.

Therefore, FIG. 1 illustrates certain embodiments in which a machine learning module 106 is used by a destage management application 104 to determine whether or not to fill holes in a track prior to destage of the track.

Figure 2:
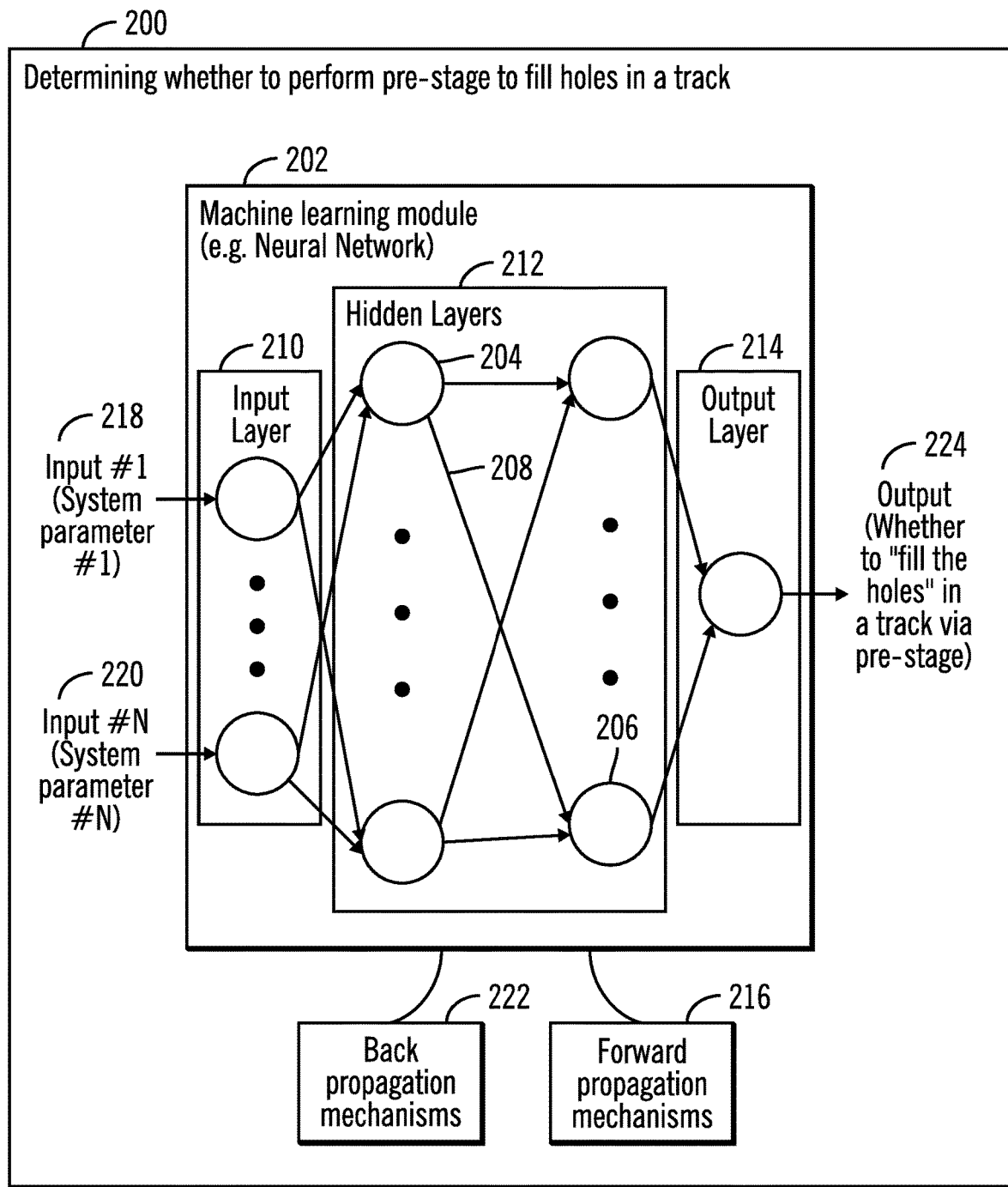
FIG. 2 illustrates a block diagram that shows a mechanism for determining whether to perform pre-stage to fill holes in a track via a destage management application and a machine learning module that comprises a neural network in accordance with certain embodiments.

FIG. 2 illustrates a block diagram 200 that shows a mechanism for determining whether to perform pre-stage to fill holes in a track via the destage management application 104 and the machine learning module 106 comprising a neural network in accordance with certain embodiments;

The neural network 202 may comprise a collection of nodes with links connecting them, where the links are referred to as connections. For example, FIG. 2 shows a node 204 connected by a connection 208 to the node 206. The collection of nodes may be organized into three main parts: an input layer 210, one or more hidden layers, 212 and an output layer 214.

The connection between one node and another is represented by a number called a weight, where the weight may be either positive (if one node excites another) or negative (if one node suppresses or inhibits another). Training the neural network 202 entails calibrating the weights in the neural network 202 via mechanisms referred to as forward propagation 216 and back propagation 222. Bias nodes that are not connected to any previous layer may also be maintained in the neural network 202. A bias is an extra input of 1 with a weight attached to it for a node.

In forward propagation 216, a set of weights are applied to the input data 218, 220 to calculate an output 224. For the first forward propagation, the set of weights are selected randomly. In back propagation 222 a measurement is made the margin of error of the output 224 and the weights are adjusted to decrease the error. Back propagation 222 compares the output that the neural network 202 produces with the output that the neural network 202 was meant to produce, and uses the difference between them to modify the weights of the connections between the nodes of the neural network 202, starting from the output layer 214 through the hidden layers 212 to the input layer 210, i.e., going backward in the neural network. 202. In time, back propagation 222 causes the neural network 202 to learn, reducing the difference between actual and intended output to the point where the two exactly coincide. Thus, the neural network 202 is configured to repeat both forward and back propagation until the weights (and potentially the biases) of the neural network 202 are calibrated to accurately predict an output.

In certain embodiments, the machine learning module 106 may be implemented in software, firmware, hardware or any combination thereof. For example, in one embodiment the machine learning module 106 may be implemented only in software, whereas in another embodiment the machine learning module 106 may be implemented in a combination of software, firmware, and hardware. In one embodiment, each node of the machine learning module 106 may be a lightweight hardware processor (e.g., a 1-bit processor) and there may be hardwired connections among the lightweight hardware processors. Software and/or firmware may implement the adjustment of weights of the links via adjustments in signals propagated via the hardwired connections.

In certain embodiments, the plurality of inputs 218, 220 comprise a plurality of system parameters of the computing environment 100. The output 224 may provide an indication as to whether to fill holes in track via pre-stage operations.

In certain embodiments, the machine learning module 106 is trained to improve the prediction of whether to fill holes in a track via pre-stage operations. The training continuously improves the predictive ability of the machine learning module 106 over time.

Figure 3:
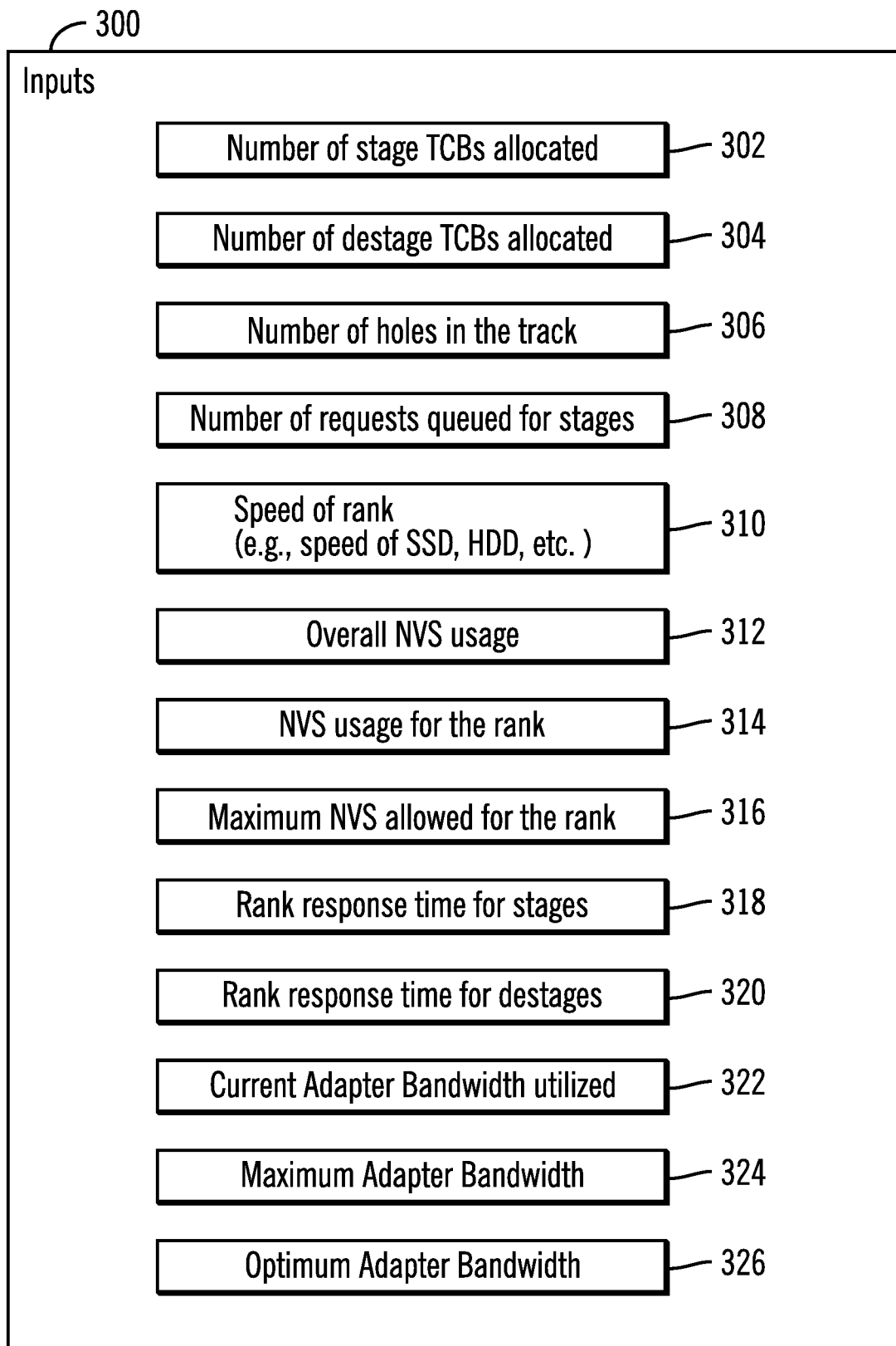
FIG. 3 illustrates a block diagram that shows exemplary inputs to the machine learning module, in accordance with certain embodiments.

FIG. 3 illustrates a block diagram that shows exemplary inputs 300 to the machine learning module comprising the neural network 106, in accordance with certain embodiments. The exemplary inputs are inputs that may affect the determination of whether or not to fill holes in a track.

In certain embodiments the exemplary inputs may be indicative of the following:
1) Number of stage task control blocks (TCB) allocated (reference numeral 302), where the stage TCBs are used for performing staging to the cache 114;
2) Number of destage TCBs allocated (reference numeral 304), where the destage TCBs are used for performing destaging from the cache 114;
3) Number of holes in the track (reference numeral 306);
4) Number of requests queued for stages (reference numeral 308);
5) Speed of rank (e.g., speed of solid state drive or hard disk drive ranks) (reference numeral 310), where the rank corresponds to the storage rank in which the track may be destaged into;
6) Overall NVS usage (reference numeral 312);
7) NVS usage for the rank (reference numeral 314);

8) Maximum NVS allowed for the rank (reference numeral 316);
9) Rank response time for stages (reference numeral 318);
10) Rank response time for destages (reference numeral 320);
11) Current adapter bandwidth utilized (reference numeral 322) which corresponds to the bandwidth utilization of a storage adapter 122;
12) Maximum adapter bandwidth (reference numeral 324) which corresponds to the maximum bandwidth of a storage adapter 122;
13) Optimum adapter bandwidth (reference numeral 326) which corresponds to the optimum of a storage adapter 122;

It should be noted that inputs shown in FIG. 3 are exemplary, and many additional types of inputs may be applied to the machine learning module comprising a neural network 106.

Figure 4:
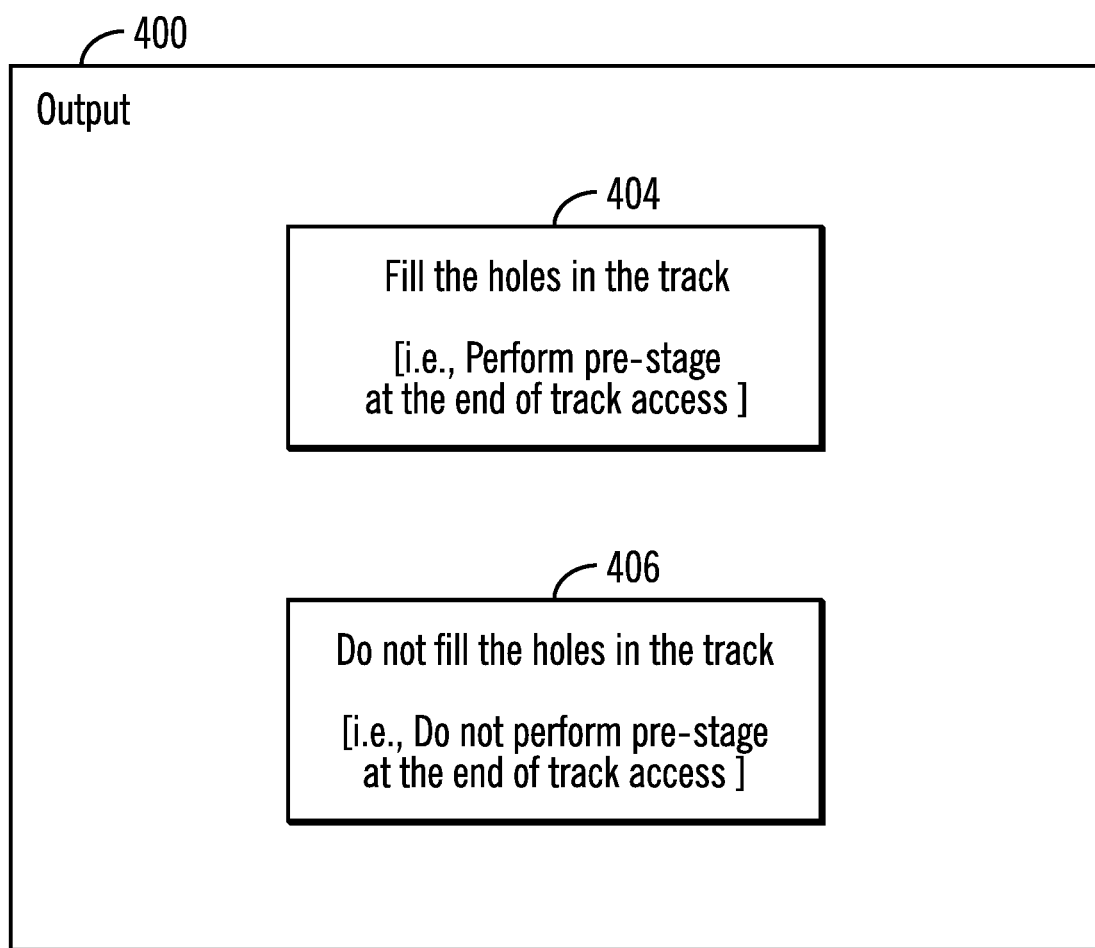
FIG. 4 illustrates block diagram that shows outputs of the machine learning module, in accordance with certain embodiments.

FIG. 4 illustrates block diagram that shows outputs of the machine learning module 106, in accordance with certain embodiments.

The output of the machine learning module 106 may be either an indication to fill the holes in a track (as shown via reference numeral 404) or not to fill the holes in a track (as shown via reference numeral 406).

If the indication is to fill the holes in a track, then pre-stages are to be performed at the end of track access to populate the holes prior to destaging the entirety of the track.

If the indication is not to fill the holes in a track, then each contiguous sector having modified data that is interspersed among the holes is destaged separately.

Figure 5:
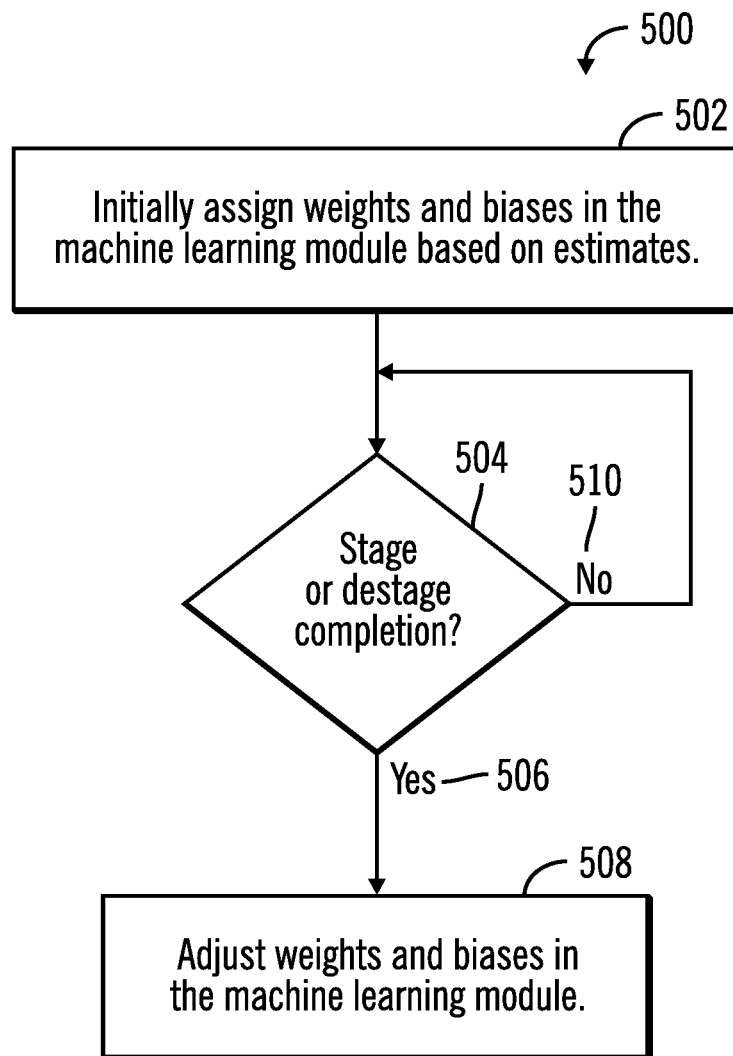
FIG. 5 illustrates a flowchart that shows how the weights and biases of the machine learning module are adjusted, in accordance with certain embodiments.

FIG. 5 illustrates a flowchart 500 that shows how the weights and biases of the machine learning module 106 are adjusted, in accordance with certain embodiments.

Control starts at block 502 in which the destage management application 104 initially assigns weights and biases in the machine learning module 106 based on estimates. A determination is made at block 504 as to whether a stage or destage completion has occurred. If so ("Yes" branch 506), control proceeds to block 508 in which weights and biases are adjusted in the machine learning module 106 based on a margin of error computed from the deviation of a generated output of the machine learning module 106 from an expected output of the machine learning module 106, where the expected output may be provided by a user. This is referred to as training the machine learning module 106 by adjustment of weights and biases so that learning occurs in the machine learning module 106 to provide improved outputs in the future.

In FIG. 5, if at block 504 a determination is made that a stage or destage has not completed ("No" branch 510) then control returns to block 504.

Figure 6:
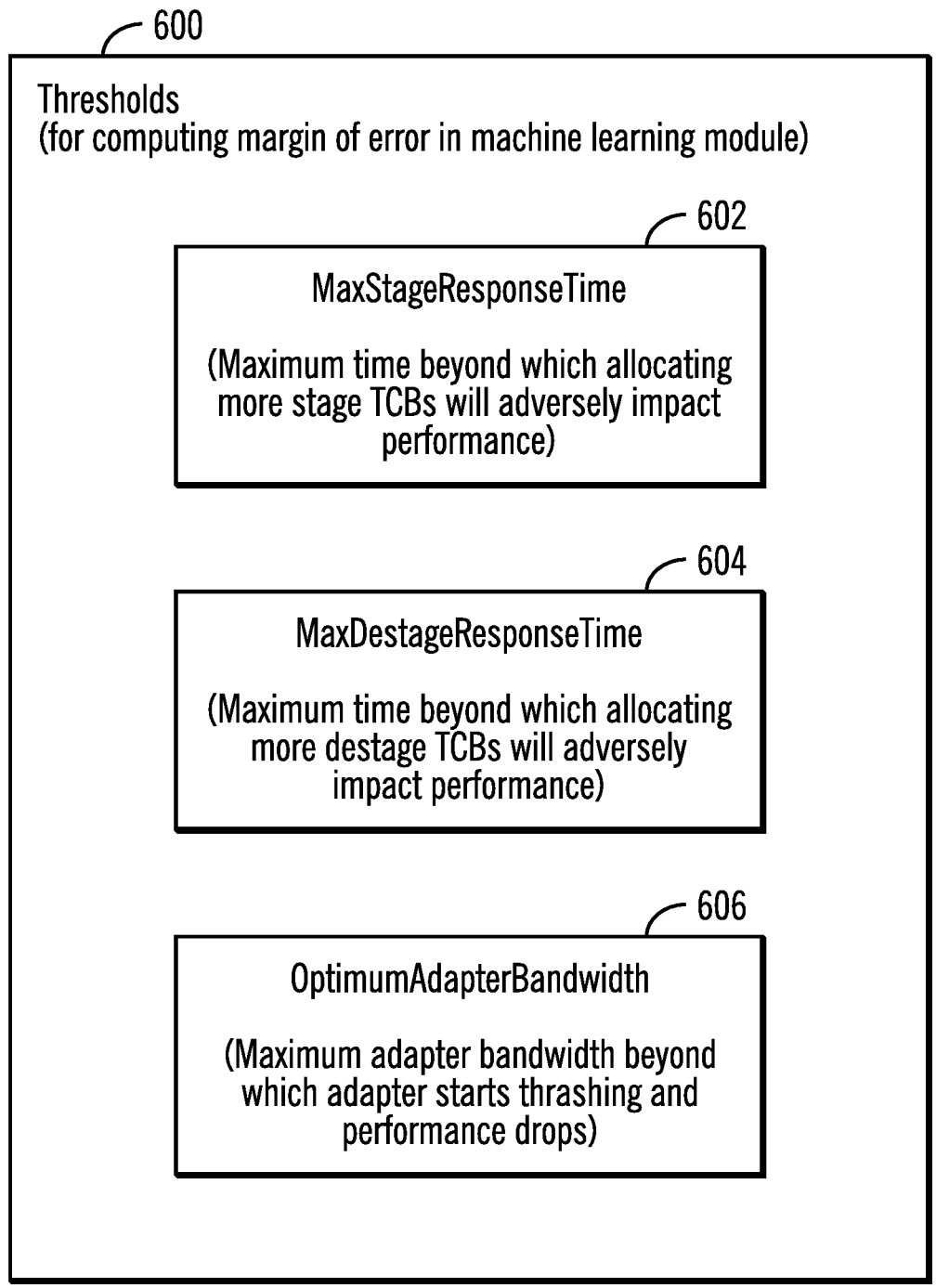
FIG. 6 illustrates a block diagram that shows certain thresholds for computing a margin of error in the machine learning module, in accordance with certain embodiments.

FIG. 6 illustrates a block diagram 600 hat shows certain thresholds for computing a margin of error in the machine learning module 106, in accordance with certain embodiments. The thresholds for computing the margin of error are as follows:
1) "MaxStageResponseTime" 602 is the maximum time beyond which allocating more stage TCBs will adversely impact performance;
2) "MaxDestageResponseTime" 604 is the maximum time beyond which allocating more destage TCBs will adversely impact performance; and
3) "OptimumAdapterBandwidth" 606 is the maximum adapter bandwidth beyond which the storage adapter 122 starts thrashing and performance drops.

Figure 7:
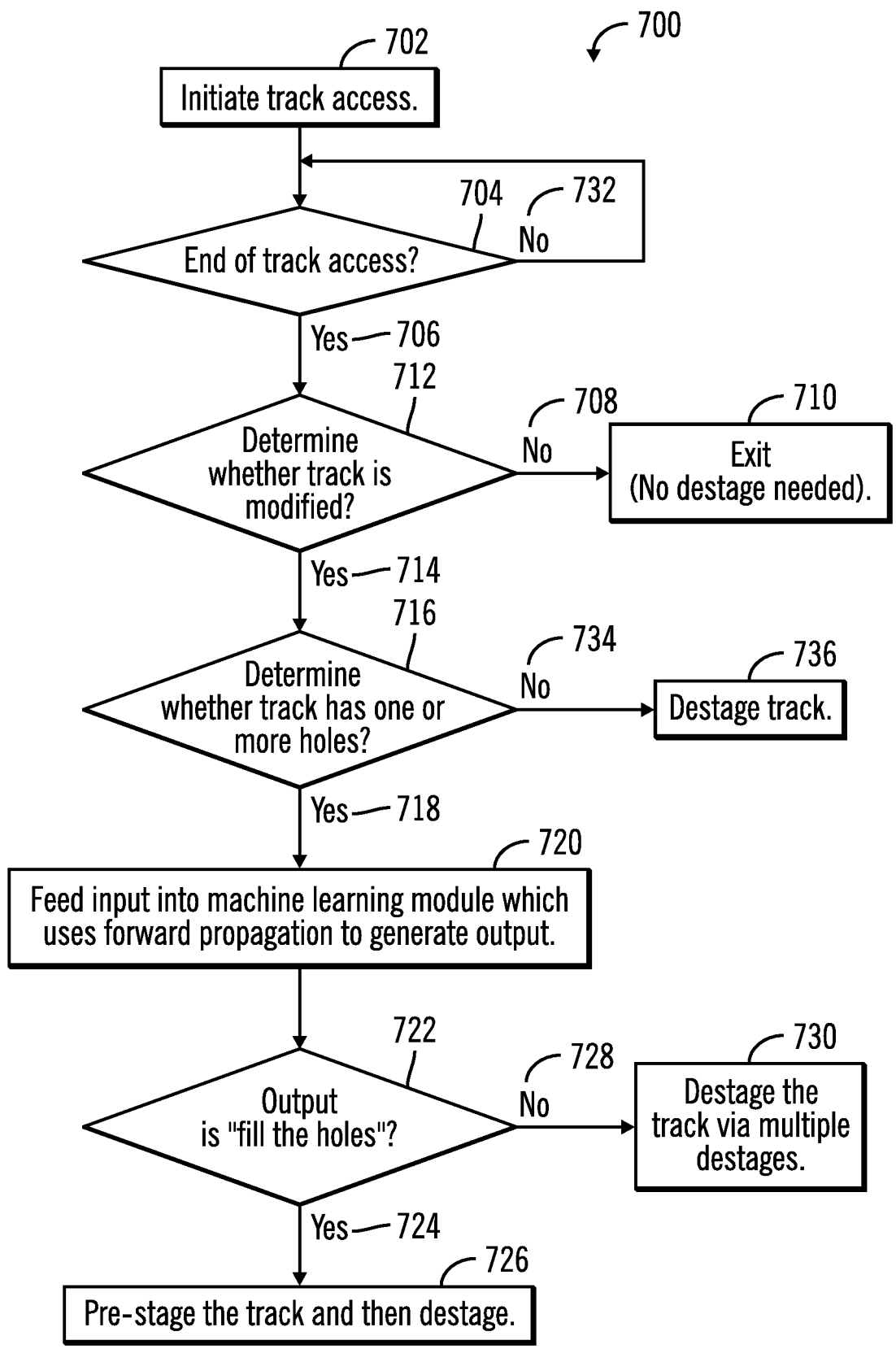
FIG. 7 illustrates a flowchart that shows mechanism for performing a pre-stage and destage of tracks at the end of track access, in accordance with certain embodiments.

FIG. 7 illustrates a flowchart 700 that shows mechanism for performing a pre-stage and destage of tracks at the end of track access, in accordance with certain embodiments.

Control starts at block 702 in which track access is initiated. The destage management application 104 determines (at block 704) whether an end of track access has occurred. If so ("Yes" branch 706) control proceeds to block 712 in which the destage management application 104 determines whether the track is modified. If so ("Yes" branch 714), the destage management application 104 determines (at block 716) whether the track has one or more holes.

If the destage management application 104 determines that the track has one or more holes ("Yes" branch 718) then control proceeds to block 720 in which the destage management application 104 feeds input into the machine learning module 106 which uses forward propagation to generate an output (at block 720).

From block 720 control proceeds to block 722 in which the destage management application 104 determines (at block 722) whether the output of the machine learning module 106 indicates that holes are to be filled. If so ("Yes" branch 724), then the destage management application 104 pre-stages the track to the cache 114 from the storage devices 110, 112 and then destages the entirety of the track in a single destage operation from the cache 114 to the storage devices 110, 112 (at block 726). If not ("No' branch 728), then the destage management application 104 destages the track via multiple destage from the cache 114 to the storage devices 110, 112 (at block 730).

If at block 704, it is determined that end of track access has not occurred ("No" branch 732), then the determination of whether end of track access has occurred is performed once again. If at block 712, the destage management application 104 determines that the track is not modified ("No" branch 708) control proceeds to block 710 where the process exits as no destage is needed. If at block 716, the destage management application 104 determines that the track does not have one or more holes ("No" branch 734) then the track is destaged (at block 736).

Therefore, FIG. 7 describes how the machine learning module 106 is used to determine when to perform a pre-stage and when to perform a destage based on forward propagation in the machine learning module 106.

Figure 8:
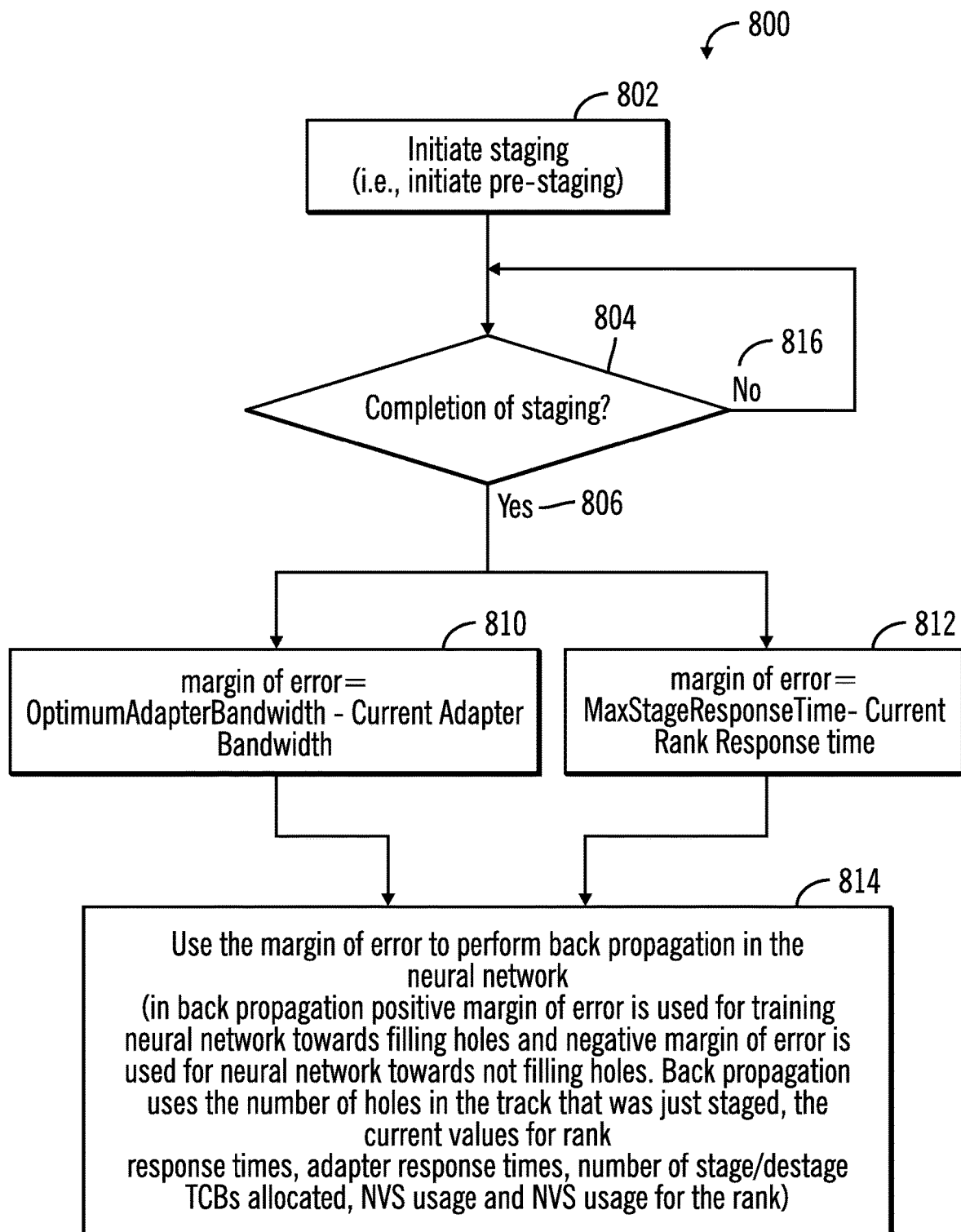
FIG. 8 illustrates a flowchart that shows how a margin of error of the machine learning module is calculated and used to perform back propagation in the machine learning module at the completion of staging, in accordance with certain embodiments.

FIG. 8 illustrates a flowchart 800 that shows how a margin of error of the machine learning module 106 is calculated and used to perform back propagation in the machine learning module 106 at the completion of staging, in accordance with certain embodiments.

Control starts at block 802 in which staging (i.e., pre-stage to cache) is initiated. The destage management application 104 determines (at block 804) whether the staging has completed. If so ("Yes" branch 806), control proceeds to blocks 810 and 812. If not ("No" branch 816) the destage management application 104 again determines whether staging has completed.

At block 810 the computing of the margin of error is based on adapter bandwidth, and is determined by computing the following:

margin of error=OptimumAdapterBandwidth−Current Adapter Bandwidth.

The margin of error (computed in block 810) may be positive or negative based on current adapter bandwidth. A positive margin of error computed in block 810 is used for training the machine learning module 106 towards filling holes and a negative margin of error computed in block 810 is used for training the machine learning module 106 towards not filling holes. The margin of error is used to perform backward propagation in the machine learning module 106.

At block 812, the computing of the margin of error is based on rank response time and is determined by computing the following:

margin of error=MaxStageResponseTime−Current Rank Response time.

The margin of error computed in block 812 may be positive or negative based on the current rank response time. A positive margin of error computed in block 812 is used for training the machine learning module 106 towards filling holes and negative margin of error computed in block 812 is used for training the machine learning module towards not filling holes. The margin of error is used to perform backward propagation in the machine learning module 106.

From blocks 810, 812 control proceeds to block 814 in which the margin of error is used to perform back propagation in the machine learning module. In back propagation performed in block 814, a positive margin of error is used for training neural network towards filling holes and negative margin of error is used for neural network towards not filling holes. Back propagation may use the number of holes in the track that was just staged, the current values for rank response times, adapter response times, number of stage/destage TCBs allocated, NVS usage and NVS usage for the rank, and other parameters.

Figure 9:
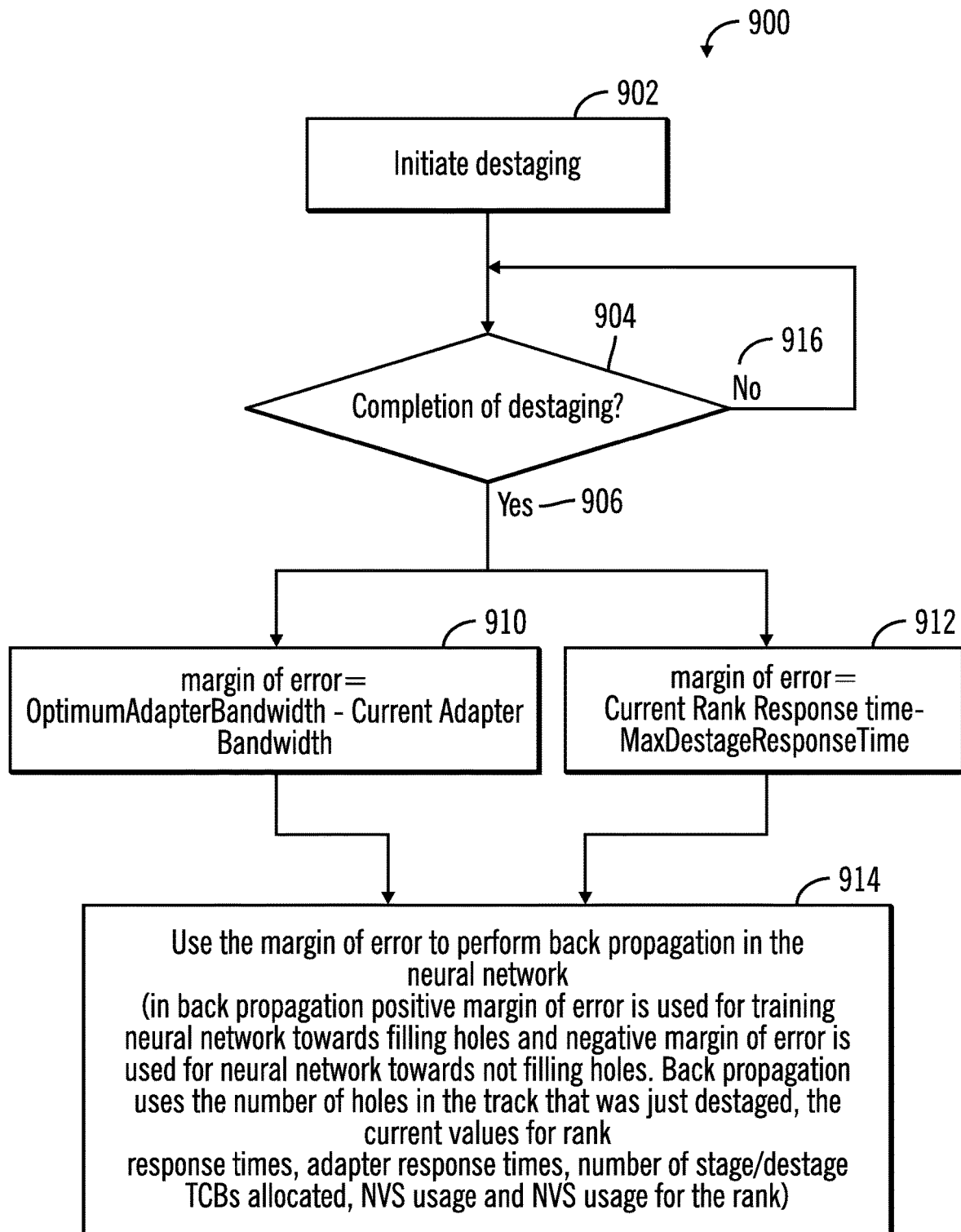
FIG. 9 illustrates a flowchart that shows how a margin of error of the machine learning module is calculated and used to perform back propagation in the machine learning module at the completion of destaging, in accordance with certain embodiments.

FIG. 9 illustrates a flowchart that shows how a margin of error of the machine learning module 106 is calculated and used to perform back propagation in the machine learning module 106 at the completion of destaging, in accordance with certain embodiments.

Control starts at block 902 in which destaging from the cache to the storage devices is initiated. The destage management application 104 determines (at block 904) whether the destaging has completed. If so ("Yes" branch 906), control proceeds to blocks 910 and 912. If not ("No" branch 916) the destage management application 104 again determines whether destaging has completed.

At block 910 the computing of the margin of error is based on adapter bandwidth, and is determined by computing the following:

margin of error=OptimumAdapterBandwidth−Current Adapter Bandwidth.

The margin of error (computed in block 910) may be positive or negative based on current adapter bandwidth. A positive margin of error computed in block 910 is used for training the machine learning module 106 towards filling holes and negative margin of error computed in block 910 is used for training the machine learning module 106 towards not filling holes. The margin of error is used to perform backward propagation in the machine learning module 106.

At block 912, the computing of the margin of error is based on rank response time and maximum destage response time and is determined by computing the following:

margin of error=Current Rank Response time−MaxDestageResponseTime.

The margin of error computed in block 912 may be positive or negative based on the current rank response time. A positive margin of error computed in block 912 is used for training the machine learning module 106 towards filling holes and negative margin of error computed in block 912 is used for training the machine learning module towards not filling holes. The margin of error is used to perform backward propagation in the machine learning module 106.

From blocks 910, 912 control proceeds to block 914 in which the margin of error is used to perform back propagation in the machine learning module. In back propagation as performed in block 914, a positive margin of error is used for training the neural network towards filling holes and negative margin of error is used for training the neural network towards not filling holes. Back propagation may use the number of holes in the track that was just destaged, the current values for rank response times, adapter response times, number of stage/destage TCBs allocated, NVS usage and NVS usage for the rank, and other parameters.

Figure 10:
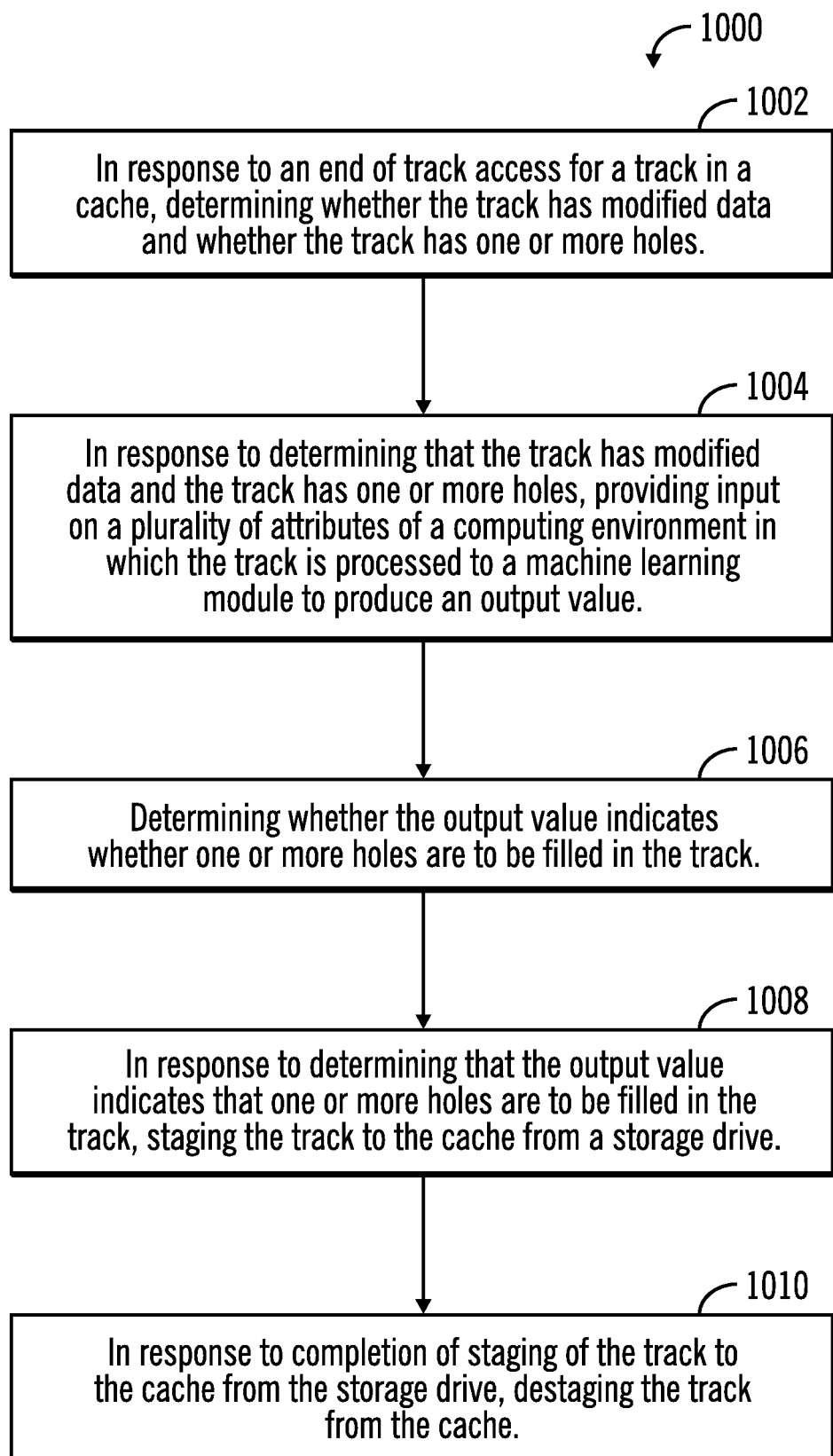
FIG. 10 illustrates a flowchart that shows the usage of a machine learning module to perform destages of tracks with holes in a storage system, in accordance with certain embodiments.

FIG. 10 illustrates a flowchart 1000 that shows the usage of a machine learning module to perform destages of tracks with holes in a storage system, in accordance with certain embodiments.

Control starts at block 1002 in which in response to an end of track access for a track in a cache, a determination is made as to whether the track has modified data and whether the track has one or more holes. In response to determining (at block 1004) that the track has modified data and the track has one or more holes, an input on a plurality of attributes of a computing environment in which the track is processed is provided to a machine learning module to produce an output value.

From block 1004 control proceeds to block 1006 in which a determination is made as to whether the output value indicates whether one or more holes are to be filled in the track. From block 1006 control proceeds to block 1008.

In block 1008, in response to determining that the output value indicates that one or more holes are to be filled in the track (at block 1008), the track is staged to the cache from a storage drive. Control proceeds to block 1010, in which in response to completion of staging of the track to the cache from the storage drive, the track is destaged from the cache.

Therefore, FIG. 10 shows how the machine learning module 106 is used to determine how to perform destages of tracks with holes in a storage system by determining the output value of the machine learning module 106.

Figure 11:
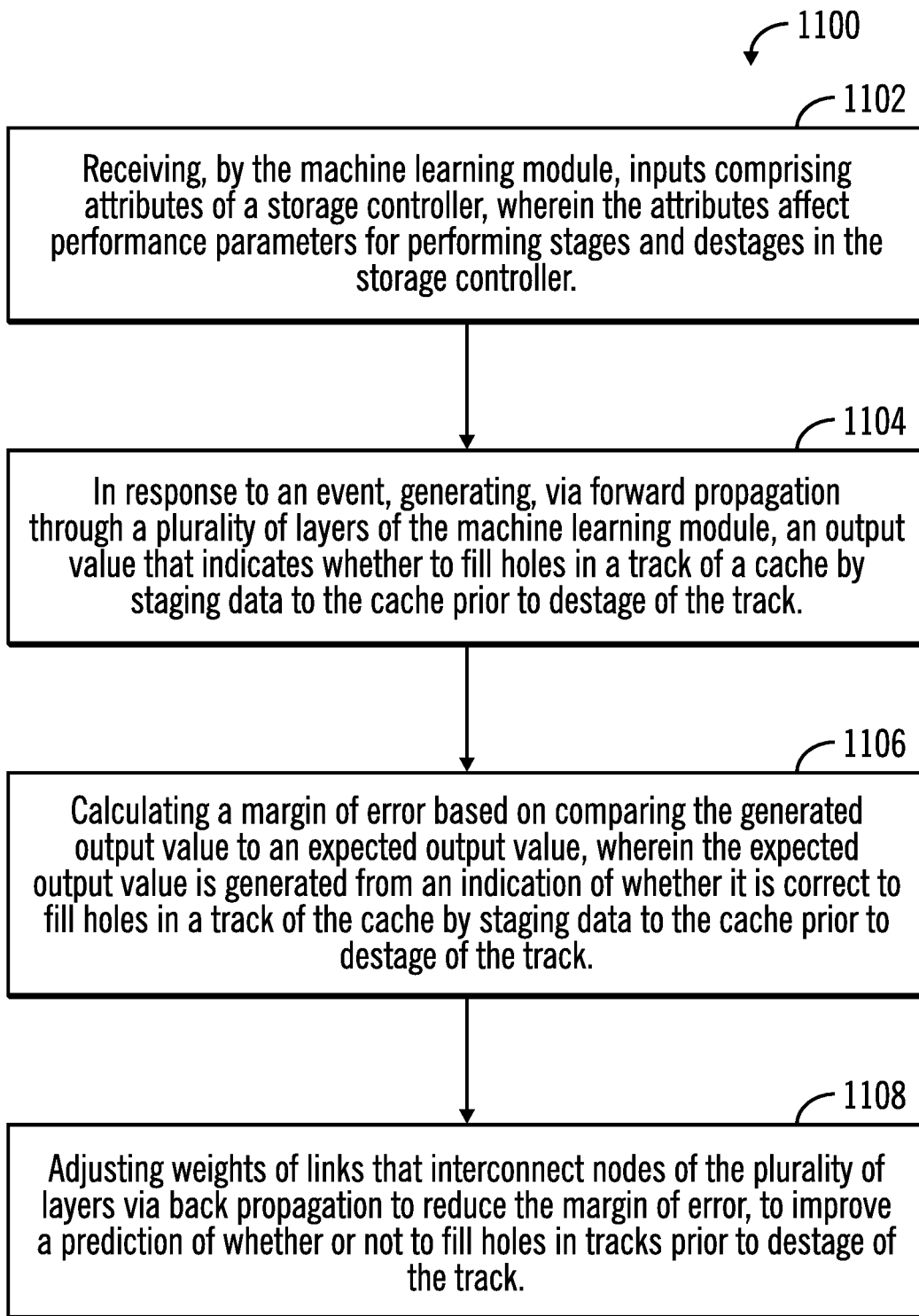
FIG. 11 illustrates a flowchart that shows the performing of destages of tracks with holes in a storage system, by training a machine learning module, in accordance with certain embodiments.

FIG. 11 illustrates a flowchart 1100 that shows the performing of destages of tracks with holes in a storage system, by training a machine learning module 106, in accordance with certain embodiments.

Control starts at block 1102 in which a machine learning module 106 receives inputs comprising attributes of a storage controller 102, wherein the attributes affect performance parameters for performing stages and destages in the storage controller 102. Control proceeds to block 1104 in which in response to an event the machine learning module 106 generates via forward propagation through a plurality of layers of the machine learning module, an output value that indicates whether to fill holes in a track of a cache by staging data to the cache prior to destage of the track.

A margin of error is calculated (at block 1106) based on comparing the generated output value to an expected output value, wherein the expected output value is generated from an indication of whether it is correct to fill holes in a track of the cache by staging data to the cache prior to destage of the track. An adjustment is made (at block 1108) weights of links that interconnect nodes of the plurality of layers via back propagation to reduce the margin of error, to improve a prediction of whether or not to fill holes in tracks prior to destage of the track.

It should be noted that the margin of error for the machine learning module may be computed differently in different embodiments. In certain embodiments, the margin of error for training the machine learning module may be based on comparing the generated output value of the machine learning to an expected output value, where the expected output value is generated from an indication of whether it is correct to fill holes in a track of the cache by staging data to the cache prior to destage of the track. In certain embodiments, the margin of error for training the machine learning module may be based on one or more of the following: a measure of a maximum stage response time beyond which allocating more task control blocks for staging to the cache reduces performance in the storage controller; a measure of a maximum destage response time beyond which allocating more task control blocks for destaging from the cache reduce a performance in the storage controller; and a measure of an optimum adapter bandwidth that comprises a bandwidth beyond which an adapter starts thrashing. Other embodiments may calculate the margin of error via different mechanisms. A plurality of margin of errors may be aggregated into a single margin of error and the single margin of error may be used to adjust weights and biases, or the machine learning module may adjust weights and biases based on a plurality of margin of errors.

Therefore, FIGS. 1-11 illustrate certain embodiments, in which a machine learning module 106 is used to determine whether or not to fill holes in a track via pre-stage, prior to destage of the track.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 12:
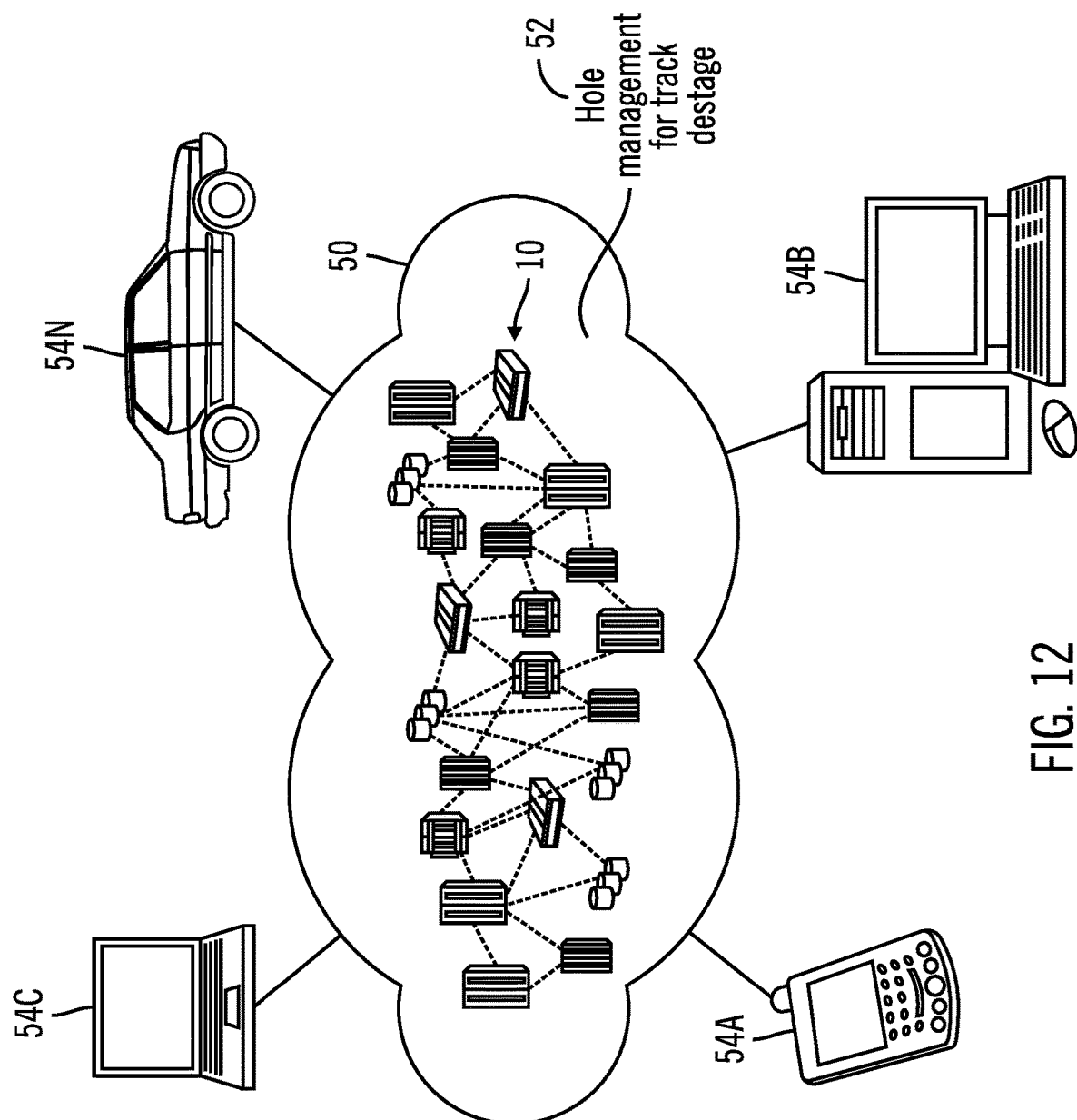
FIG. 12 illustrates a block diagram of a cloud computing environment for implementing the operations described in FIGS. 1-11, in accordance with certain embodiments.

Referring now to FIG. 12 an illustrative cloud computing environment 50 is depicted. Hole management for track destage (shown via reference numeral 52) is performed in the cloud computing environment 50. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 13:
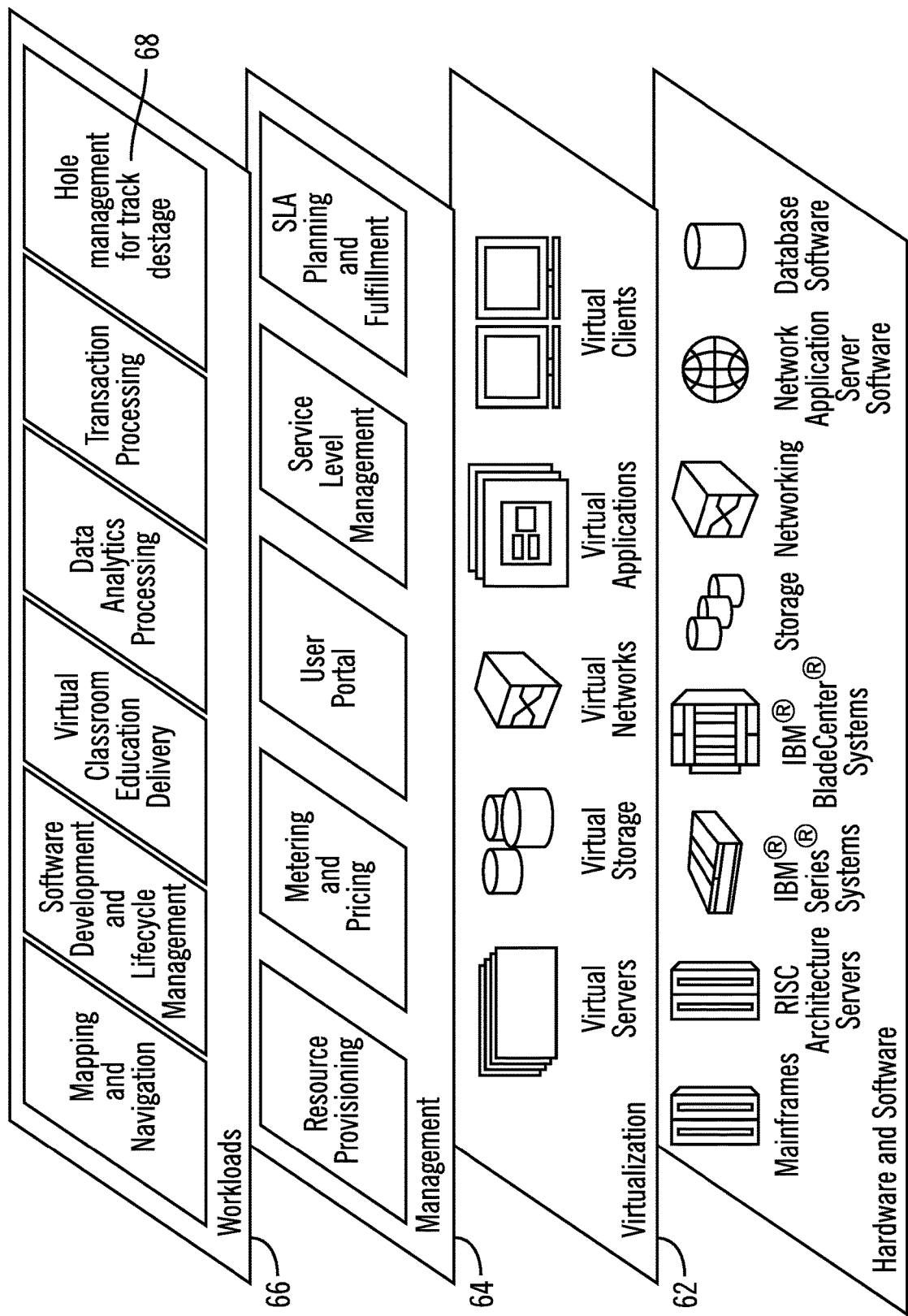
FIG. 13 illustrates a block diagram that shows further details of the cloud computing environment of FIG. 12 in accordance with certain embodiments.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and hole management for track destage 68 as shown in FIGS. 1-12.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 14:
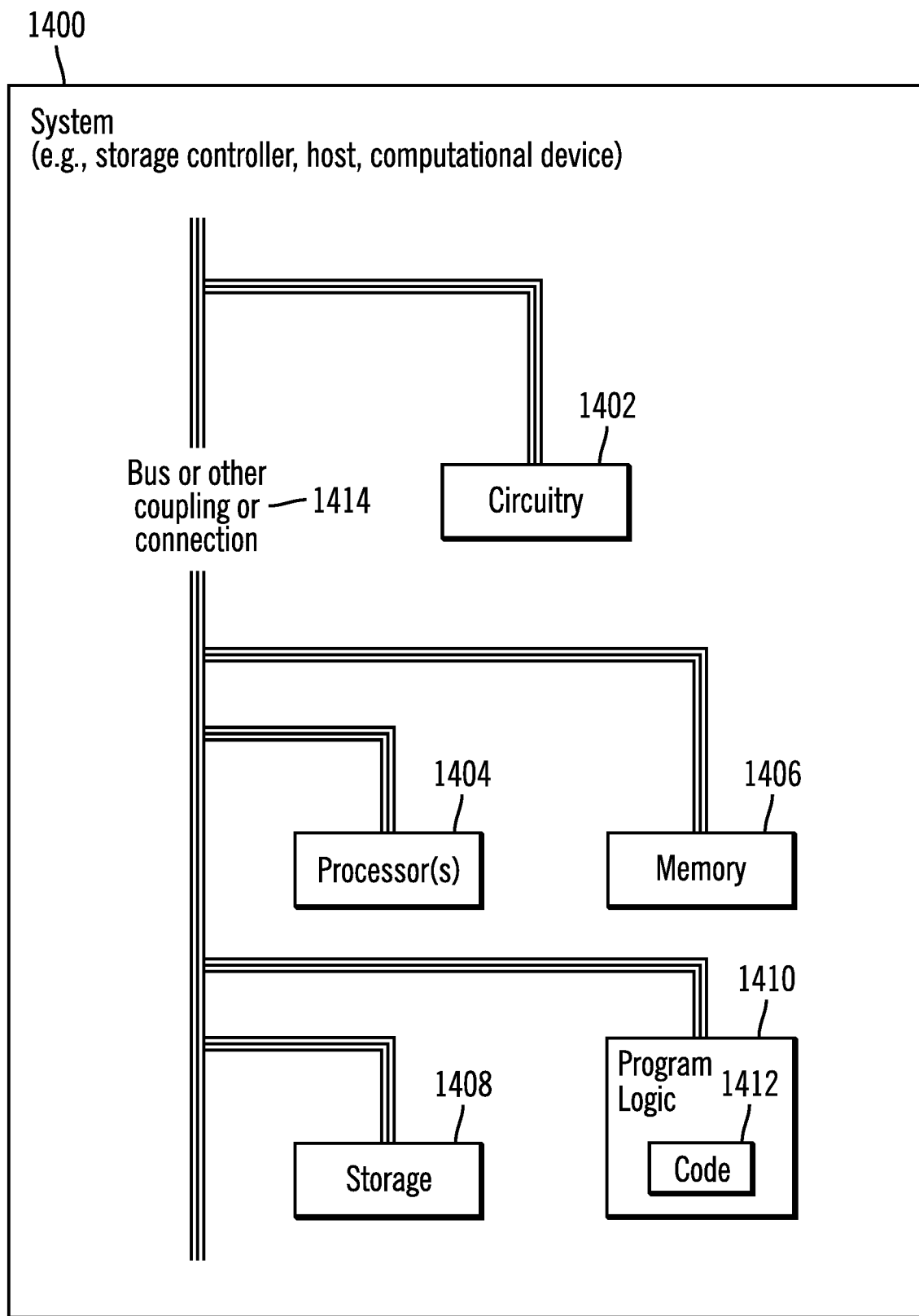
FIG. 14 illustrates a block diagram of a computational system, in accordance with certain embodiments.

FIG. 14 illustrates a block diagram that shows certain elements that may be included in the storage controller 102, or other computational devices 108 in accordance with certain embodiments. The system 1400 may include a circuitry 1402 that may in certain embodiments include at least a processor 1404. The system 1400 may also include a memory 1406 (e.g., a volatile memory device), and storage 1408. The storage 1408 may include a non-volatile memory device (e.g., EEPROM, ROM, PROM, flash, firmware, programmable logic, etc.), magnetic disk drive, optical disk drive, tape drive, etc. The storage 1408 may comprise an internal storage device, an attached storage device and/or a network accessible storage device. The system 1400 may include a program logic 1410 including code 1412 that may be loaded into the memory 1406 and executed by the processor 1404 or circuitry 1402. In certain embodiments, the program logic 1410 including code 1412 may be stored in the storage 1408. In certain other embodiments, the program logic 1410 may be implemented in the circuitry 1402. One or more of the components in the system 1400 may communicate via a bus or via other coupling or connection 1414. Therefore, while FIG. 14 shows the program logic 1410 separately from the other elements, the program logic 1410 may be implemented in the memory 1406 and/or the circuitry 1402.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article may be used in place of a single device/article. Similarly, where more than one device or article is described herein, it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   in response to an end of track access for a track in a cache, determining whether the track has modified data and whether the track has one or more holes; and
   in response to determining that the track has modified data and the track has one or more holes, providing input on a plurality of attributes of a computing environment in which the track is processed to a machine learning module to produce an output value;
   determining whether the output value indicates whether one or more holes are to be filled in the track; and
   in response to determining that the output value indicates that one or more holes are to be filled in the track, staging the track to the cache from a storage drive, wherein a margin of error for training the machine learning module on completion of staging is based at least on computing a difference of an optimum adapter bandwidth and a current adapter bandwidth, and on computing a difference of a maximum stage response time and a current rank response time.

2. The method of claim 1, the method further comprising:
   in response to completion of staging of the track to the cache from the storage drive, destaging the track from the cache.

3. The method of claim 2, wherein the computing environment comprises a storage controller having the cache, wherein the storage controller is coupled to one or more storage drives in a RAID configuration that stores parity information, wherein the storage controller manages the one or more storage drives to allow input/output (I/O) access to one or more host computing systems.

4. The method of claim 1, wherein the plurality of attributes further includes:
   a measure of the current adapter bandwidth; and
   a measure of the optimum adapter bandwidth, wherein an adapter starts thrashing if the optimum adapter bandwidth is exceeded.

5. The method of claim 4, the plurality of attributes further include:
   a measure of a speed for a storage rank in which the storage drive is included;
   a measure of a response time of the storage rank for staging; and
   a measure of a response time of the storage rank for destaging.

6. The method of claim 5, the plurality of attributes include:
   a measure of how many task control blocks are allocated for staging;

a measure of how many task control blocks are allocated for destaging;
a measure of how many holes are present in the track; and
a measure of how many requests are queued for staging.

7. The method of claim 6, the plurality of attributes further include:
a measure of an overall non-volatile storage usage;
a measure of a non-volatile storage usage for a rank that includes the storage drive; and
a measure of a maximum non-volatile storage allowed for the rank.

8. A system, comprising:
a memory; and
a processor coupled to the memory, wherein the processor performs operations, the operations comprising:
in response to an end of track access for a track in a cache, determining whether the track has modified data and whether the track has one or more holes; and
in response to determining that the track has modified data and the track has one or more holes, providing input on a plurality of attributes of a computing environment in which the track is processed to a machine learning module to produce an output value;
determining whether the output value indicates whether one or more holes are to be filled in the track; and
in response to determining that the output value indicates that one or more holes are to be filled in the track, staging the track to the cache from a storage drive, wherein a margin of error for training the machine learning module on completion of staging is based at least on computing a difference of an optimum adapter bandwidth and a current adapter bandwidth, and on computing a difference of a maximum stage response time and a current rank response time.

9. The system of claim 8, the operations further comprising:
in response to completion of staging of the track to the cache from the storage drive, destaging the track from the cache.

10. The system of claim 9, wherein the computing environment comprises a storage controller having the cache, wherein the storage controller is coupled to one or more storage drives in a RAID configuration that stores parity information, wherein the storage controller manages the one or more storage drives to allow input/output (I/O) access to one or more host computing systems.

11. The system of claim 8, wherein the plurality of attributes further includes:
a measure of the current adapter bandwidth; and
a measure of the optimum adapter bandwidth, wherein an adapter starts thrashing if the optimum adapter bandwidth is exceeded.

12. The system of claim 11, the plurality of attributes further include:
a measure of a speed for a storage rank in which the storage drive is included;
a measure of a response time of the storage rank for staging; and
a measure of a response time of the storage rank for destaging.

13. The system of claim 12, the plurality of attributes include:
a measure of how many task control blocks are allocated for staging;
a measure of how many task control blocks are allocated for destaging;
a measure of how many holes are present in the track; and
a measure of how many requests are queued for staging.

14. The system of claim 13, the plurality of attributes further include:
a measure of an overall non-volatile storage usage;
a measure of a non-volatile storage usage for a rank that includes the storage drive; and
a measure of a maximum non-volatile storage allowed for the rank.

15. A computer program product, the computer program product comprising a computer readable storage medium having computer readable program code embodied therewith, the computer readable program code configured to perform operations in a computational device, the operations comprising:
in response to an end of track access for a track in a cache, determining whether the track has modified data and whether the track has one or more holes; and
in response to determining that the track has modified data and the track has one or more holes, providing input on a plurality of attributes of a computing environment in which the track is processed to a machine learning module to produce an output value;
determining whether the output value indicates whether one or more holes are to be filled in the track; and
in response to determining that the output value indicates that one or more holes are to be filled in the track, staging the track to the cache from a storage drive, wherein a margin of error for training the machine learning module on completion of staging is based at least on computing a difference of an optimum adapter bandwidth and a current adapter bandwidth, and on computing a difference of a maximum stage response time and a current rank response time.

16. The computer program product of claim 15, the operations further comprising:
in response to completion of staging of the track to the cache from the storage drive, destaging the track from the cache.

17. The computer program product of claim 16, wherein the computing environment comprises a storage controller having the cache, wherein the storage controller is coupled to one or more storage drives in a RAID configuration that stores parity information, wherein the storage controller manages the one or more storage drives to allow input/output (I/O) access to one or more host computing systems.

18. The computer program product of claim 15, wherein the plurality of attributes further includes:
a measure of the current adapter bandwidth; and
a measure of the optimum adapter bandwidth, wherein an adapter starts thrashing if the optimum adapter bandwidth is exceeded.

19. The computer program product of claim 18, the plurality of attributes further include:
a measure of a speed for a storage rank in which the storage drive is included;
a measure of a response time of the storage rank for staging; and
a measure of a response time of the storage rank for destaging.

20. The computer program product of claim 19, the plurality of attributes include:
a measure of how many task control blocks are allocated for staging;
a measure of how many task control blocks are allocated for destaging;
a measure of how many holes are present in the track; and
a measure of how many requests are queued for staging.

21. The computer program product of claim 20, the plurality of attributes further include:
  a measure of an overall non-volatile storage usage;
  a measure of a non-volatile storage usage for a rank that includes the storage drive; and
  a measure of a maximum non-volatile storage allowed for the rank.

22. A storage controller, wherein the storage controller is configured to perform operations, the operation, comprising:
  in response to an end of track access for a track in a cache, determining whether the track has modified data and whether the track has one or more holes; and
  in response to determining that the track has modified data and the track has one or more holes, providing input on a plurality of attributes of a computing environment in which the track is processed to a machine learning module to produce an output value;
  determining whether the output value indicates whether one or more holes are to be filled in the track; and
  in response to determining that the output value indicates that one or more holes are to be filled in the track, staging the track to the cache from a storage drive, wherein a margin of error for training the machine learning module on completion of staging is based at least on computing a difference of an optimum adapter bandwidth and a current adapter bandwidth, and on computing a difference of a maximum stage response time and a current rank response time.

23. The storage controller of claim 22, the operations further comprising:
  in response to completion of staging of the track to the cache from the storage drive, destaging the track from the cache.

24. The storage controller of claim 23, wherein the computing environment comprises a storage controller having the cache, wherein the storage controller is coupled to one or more storage drives in a RAID configuration that stores parity information, wherein the storage controller manages the one or more storage drives to allow input/output (I/O) access to one or more host computing systems.

25. The storage controller of claim 22, wherein the plurality of attributes further includes:
  a measure of the current adapter bandwidth; and
  a measure of the optimum adapter bandwidth, wherein an adapter starts thrashing if the optimum adapter bandwidth is exceeded.

* * * * *